H. M. ROBERTSON.
CAR BRAKE ACTUATING MECHANISM.
APPLICATION FILED AUG. 22, 1919.
1,330,282. Patented Feb. 10, 1920.
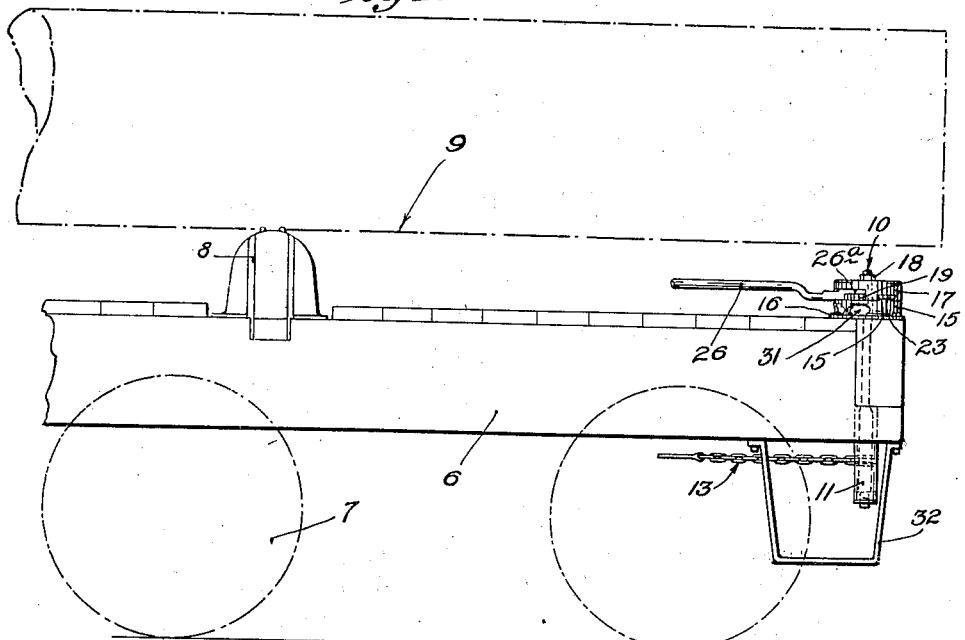
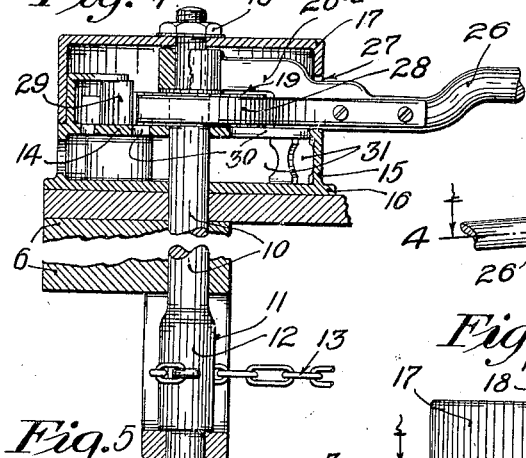
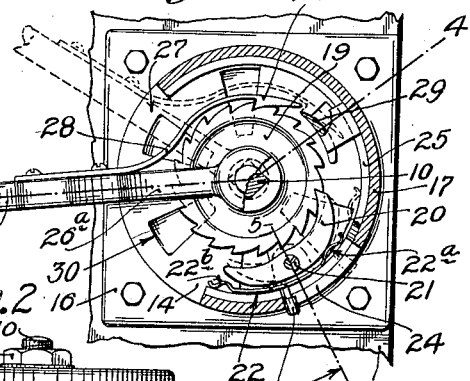
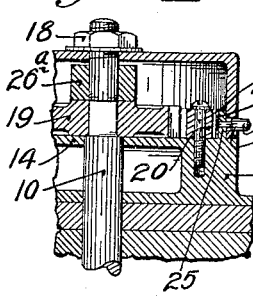
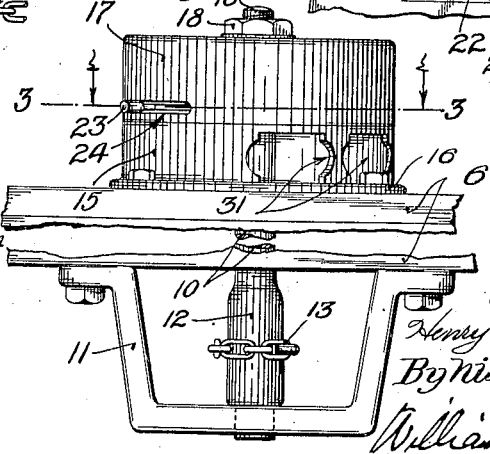
Inventor
Henry M. Robertson
By his Attorneys

UNITED STATES PATENT OFFICE.

HENRY M. ROBERTSON, OF ST. PAUL, MINNESOTA.

CAR-BRAKE-ACTUATING MECHANISM.

1,330,282.   Specification of Letters Patent.   Patented Feb. 10, 1920.

Application filed August 22, 1919. Serial No. 319,107.

*To all whom it may concern:*

Be it known that I, HENRY M. ROBERTSON, a citizen of the United States, residing at St. Paul, in the county of Ramsey and State of Minnesota, have invented certain new and useful Improvements in Car-Brake-Actuating Mechanism; and I do hereby declare the following to be a full, clear, and exact description of the invention, such as will enable others skilled in the art to which it appertains to make and use the same.

My present invention relates to car brake actuating mechanism and has for its object to improve the same in the several particulars hereinafter noted, and generally stated, the invention consists of the novel devices and combinations of devices hereinafter described and defined in the claims.

In car brake actuating mechanism, as hitherto designed, it has been customary practice to provide the brake staff upon which the brake chain is wound, with a ratchet wheel and to provide a manually operated retaining dog for operation on its ratchet wheel to hold the brakes set. In some of the hitherto used brake actuating mechanisms, the brake staff has been provided with a hand wheel, and in others, a lever and pawl and ratchet device has been provided for rotating the brake staff, but in all instances, so far as I am aware, to release the said brakes it has been necessary by manual operation either with the foot or with the hand, to release the retaining dog at a time and while the hands of the operator are used on the brake wheel or lever, exerting a force thereon sufficient to relieve the retaining dog in the brake setting pressure. Otherwise stated, the brake set pressure on the retaining dog prevents the same from being released, solely either by the foot or hand, and hence, two operations must be performed at once, to wit, the brake pressure must be relieved by the hands and the retaining dog by the foot. These two operations are, at least, very difficult to perform in all arrangements of the brake actuating mechanism, and in some arrangements, it is exceedingly difficult and practically impossible to simultaneously perform the two operations.

My improved brake actuating mechanism involves particularly, two radically new features of improvements, to wit, first, an improved form of lever and ratchet mechanism for rotating the brake staff, and second, an arrangement of the retaining dog and the coöperative releasing devices, whereby, in advance of the application of power to the set brakes, to release the same, the retaining dog may be so set that it will automatically release itself later on, or in a subsequent instant when the ratchet mechanism of the lever is automatically released by a predetermined movement of the brake lever.

An application of the improved brake actuating mechanism to a flat car is illustrated in the accompanying drawings but will, of course, be understood that this improved brake actuating mechanism is capable of various different applications, both to freight cars and to passenger cars.

Referring to the said drawings wherein like characters indicate like parts throughout the several views, Figure 1 is a side elevation partly in diagram with some parts broken away, showing the improved brake actuating mechanism applied to a flat car;

Fig. 2 is a front elevation of the brake actuating mechanism, some parts being broken away;

Fig. 3 is a horizontal section taken approximately on a line 3—3 of Fig. 2;

Fig. 4 is a vertical section taken approximately on the line 4—4 of Fig. 3, some parts being broken away; and Fig. 5 is a fragmentary section on the line 5—5 of Fig. 3.

Of the parts of the flat car, the numeral 6 indicates the car body and the numeral 7 the wheels, which latter are indicated diagrammatically by dotted lines. The car body 6 is shown as provided with bunks 8 adapted to carry logs 9, which latter are also indicated by dotted lines.

The brake staff 10 is shown as applied in a vertical position to one end of the car body 6, being journaled at its lower end in a yoke-like bracket 11, within which bracket said staff is provided with an enlarged portion 12 affording a windlass drum to which is attached and upon which is adapted to be wound a brake chain 13. Above the car body 6 the brake staff is extended upward through a circular bearing table 14 shown as provided with a depending marginal flange 15 and a base plate 16 rigidly secured on top of the car body. The inverted hollow casing 17 fits on and is detachably secured to the table 14 and the brake staff 10, at its upper end, extends through the top of this casing 17 and the top thereof is shown as provided with a nut 18. Just above the table 14, the brake staff has a rigidly secured ratchet wheel 19 that is arranged to be engaged by a retaining dog 20 immediately pivoted to said table at 21 and provided with a tail portion projecting beyond said pivot. Here it is important to note that the outer edge of the retaining dog 20 is convexly curved on both sides of its pivot.

For action on the retaining dog, I provide an actuating spring adapted to be set in one position to yieldingly hold the retaining dog for action on the ratchet teeth of the wheel 19 and adapted to be set in another position to put the said dog under yielding strain to move into a releasing position as soon as the said dog is released from the brake setting pressure. This actuating spring, preferably, and as shown, is a flat spring bow 22 which, at its intermediate portion, has a radially projecting finger piece 23 that works in and projects outward through a segmental slot 24 formed in an upturned segmental flange 25 on the top of the table 14. At one end, the spring 22 has a bulged spring end 22$^a$ and at its other end a similar spring bulge 22$^b$. The spring 22 slides circumferentially between the back of the retaining dog 20 and the segmental flange 25. When the said spring is adjusted to the left or as shown by full lines in Fig. 3, its bulged end 22$^a$ engages a convex outer edge of the retaining dog 20 and yieldingly holds said retaining dog for action on the teeth of ratchet wheel 19; but when the said spring 22 is moved to its extreme position toward the right or to the position indicated by dotted lines in Fig. 3, then the bulged end 22$^b$ of said spring comes into action on the teeth end of the dog 20 and then exerts a force which tends to move said dog into an inoperative or releasing position. Here, however, it should be noted that if the brakes are set and the strain thereof on the dog 20 such that the dog will not be released instantly upon movement of the actuating spring to the dotted line position stated, then the said dog will not immediately be released but will thereafter be automatically released the first instant that the brake setting pressure is removed from the said retaining dog.

The numeral 26 indicates a brake lever which, at its inner end, has a vertically offset portion 26$^a$ that is pivoted to the upper end of the brake staff 10 just above the ratchet wheel 19 and just below the top of the case 17. The casing 17 is provided with a segmental slot 27 through which the lever freely works.

Brake lever 26 is provided with a driving dog for action on the teeth of ratchet wheel 19; and preferably, this retaining dog is in the form of a curved flat spring 28 secured at one end of said lever and provided at its free end with a hook-like ratchet nose 28$^a$ for direct action on the teeth of the ratchet wheel. Under extreme movement of the lever to a position shown by dotted lines in Fig. 3, the beveled nose 28$^a$ of the driving dog 28 will be thrown into engagement with a tripping cam 29 (see particularly Figs. 3 and 4) which is rigidly secured to the table 14.

Some cinders may get into the casing 17, and to prevent these cinders from interfering with the ratchet actions, the table 14 is provided with a plurality of openings 30, which permit the cinders to drop down into the lower compartment of the casing, and from which lower compartment the cinders may be removed through peripheral openings 31 in the flange 15.

In Fig. 1 the numeral 32 indicates an ordinary sill step, such as usually provided on freight cars, and on which the brakeman may stand while operating the brake mechanism.

*Operation.*

The operation may be briefly summarized as follows:

The brakeman can use either one or both hands to operate the brake lever 26, and this is true whether the lever is used to set the brakes or to release the brakes, for the reason that neither hand is required for any other operation at a time when the brake lever is being operated. The brakes are, of course, set by oscillating the lever.

When the brakes are to be set, the dog actuating spring 22 is placed in position shown by full lines in Fig. 3, and then the brakes may be set by oscillation of the brake lever 26. In thus setting the brakes, it is immaterial whether or not the nose of the dog 28 is engaged with the tripping cam 29, because the retaining dog will hold the brake staff against unwinding movement even while the driving dog is released from the ratchet wheel.

After the brakes have been set and when it is desired to release the same, the operator first shifts the actuating spring 22 to the dotted line position Fig. 3, but this, as before stated, will not cause the brakes to be immediately released. Then the operator, by the use of the lever 26, rotates the brake staff slightly in the direction to set the brakes, so as to relieve the retaining dog from the brake setting pressure, and thereupon, the spring 22, set as stated, will instantly throw the retaining dog into its inoperative or releasing position. Then the operator permits the lever, with its driving dog engaged by the ratchet wheel, under the pressure of the said brakes, to move to the dotted line position, Fig. 3, and in which position the ratchet nose 28ª of the dog 28 will be engaged with the tripping cam 29 and automatically forced out of engagement with the teeth of the ratchet wheel, thereby completing the release of the brakes. Obviously, while the brake staff and ratchet wheel are being rotated by the released brakes, the retaining dog 20 will be held out of engagement with the teeth of the ratchet wheel by its spring 22, and at the same time, the nose of the driving dog 28 will be held out of engagement with the teeth of said ratchet wheel by the tripping cam 29.

It is further important to note in the above described arrangement of the brake actuating mechanism, the brake staff requires but one ratchet wheel, for the reason that both the retaining dog and the lever-actuated driving dog operate on the same ratchet wheel. In prior arrangements it has been customary to provide the brake staff with two ratchet wheels, one located low down for coöperation with the retaining dog and the other higher up for coöperation with the driving dog of the brake lever. The above arrangement not only is economical, but affords a compact arrangement which is applicable in many places where the two ratchet wheel arrangement would not be practicable or possible. Nevertheless, so far as the broad feature of the releasing device with the retaining dog is concerned, the invention is not limited to the number of ratchet wheels employed on the brake staff.

What I claim is:

1. In a brake mechanism, the combination with a brake staff, of a retaining device and an operating device therefor, and a releasing device adapted to be adjusted in advance and while the brakes are set and thereby put under tension, to subsequently release said retaining device when the latter is relieved from set brake pressure.

2. In a brake mechanism, the combination with a brake staff, of pawl and ratchet retaining and operating devices therefor, and a yielding releasing device shiftable from one position to another and arranged, in one position to render said retaining dog operative, and in another position to set the same under strain to move into a released position as soon as relieved from set brake pressure.

3. In a brake mechanism, the combination with a brake staff equipped with a ratchet wheel, of an oscillatory dog-equipped lever operative to rotate said staff, a retaining dog coöperating with said ratchet wheel, and a shiftable actuating spring operative on said retaining dog, said actuating spring coöperating with said retaining dog and operative thereon in one position to render the same operative on said ratchet wheel, but operative in another position to set said retaining dog under strain to move into a releasing or inoperative position.

4. In a brake mechanism, the combination with a brake staff equipped with a ratchet wheel, of an oscillatory lever provided with a driving dog operative on said ratchet wheel, a dog tripping device operative to release said dog in one position of said lever, a retaining dog coöperating with said ratchet wheel, and a dog actuating spring shiftable from one position to another and operative in one position to render said retaining dog operative on said ratchet wheel and operative in another position to put said retaining dog under yielding strain to enter a releasing or inoperative position.

5. In a brake mechanism, the combination with a brake staff equipped with a ratchet wheel, of a lever pivoted on said staff and provided with a driving dog operative on said ratchet wheel, a fixed tripping cam operative to release said driving dog from said ratchet wheel in one extreme position of said lever, an intermediately pivoted retaining dog coöperating with said ratchet wheel, and provided with a curved outer edge on both sides of its pivot, a cylindrical supporting flange adjacent to the outer edge of said retaining dog, and an actuating spring slidably mounted on said flange and provided with spring ends for action on the opposite end portions of said retaining dog, said actuating spring, when set in one position, serving to render said retaining dog operative on said ratchet wheel and in another position to put said dog under yielding strain to move into a releasing or inoperative position.

6. In a brake-actuating mechanism, the combination with a brake staff equipped with a ratchet wheel, of a lever pivoted on said brake staff and provided with a driving dog in the form of a spring arm secured to said lever at one end, and provided at its free end with a beveled nose operative on the teeth of said ratchet wheel, a fixed tripping cam with which the nose of said driving dog is engaged and by which it is released in one extreme position of said lever, and a retaining dog operative on said ratchet wheel.

7. In a brake actuating mechanism, the combination with a brake staff equipped with a ratchet wheel, of a retaining dog operative on said ratchet wheel, an oscillating lever equipped with a driving dog operative on said ratchet wheel, means for releasing said driving dog in one extreme position of said lever, and means adapted to be set in advance to release said retaining dog when the latter is relieved from set brake pressure.

8. In a brake mechanism, the combination with a brake-setting element and a retaining device and an operating device therefor, of a releasing device adapted to be set in advance and while the brakes are set and thereby put under strain to subsequently release said retaining devices when the latter is relieved from set brake pressure.

In testimony whereof I affix my signature in presence of two witnesses.

HENRY M. ROBERTSON.

Witnesses:
CLARA DEMAREST,
HARRY D. KILGORE.